US012597824B2

(12) United States Patent
Araki et al.

(10) Patent No.: US 12,597,824 B2
(45) Date of Patent: Apr. 7, 2026

(54) ROTATING ELECTRIC MACHINE CASE AND ROTATING ELECTRIC MACHINE

(71) Applicant: TOSHIBA INDUSTRIAL PRODUCTS AND SYSTEMS CORPORATION, Kanagawa (JP)

(72) Inventors: Takashi Araki, Mie (JP); Toshiaki Hirate, Mie (JP); Motoyasu Mochiduki, Mie (JP); Masaaki Matsumoto, Mie (JP)

(73) Assignee: TOSHIBA INDUSTRIAL PRODUCTS AND SYSTEMS CORPORATION, Kanagawa (JP)

( * ) Notice: Subject to any disclaimer, the term of this patent is extended or adjusted under 35 U.S.C. 154(b) by 205 days.

(21) Appl. No.: 18/566,509

(22) PCT Filed: Jun. 14, 2022

(86) PCT No.: PCT/JP2022/023791
§ 371 (c)(1),
(2) Date: Dec. 1, 2023

(87) PCT Pub. No.: WO2022/265009
PCT Pub. Date: Dec. 22, 2022

(65) Prior Publication Data
US 2024/0266904 A1 Aug. 8, 2024

(30) Foreign Application Priority Data
Jun. 18, 2021 (JP) ................................. 2021-101705

(51) Int. Cl.
*H02K 5/20* (2006.01)
*H02K 9/19* (2006.01)
(52) U.S. Cl.
CPC .............. *H02K 5/203* (2021.01); *H02K 9/19* (2013.01)

(58) Field of Classification Search
CPC ................................. H02K 9/19; H02K 5/203
See application file for complete search history.

(56) References Cited

U.S. PATENT DOCUMENTS

2014/0241865 A1* 8/2014 Arimatsu ............... H02K 5/203
29/889
2019/0305615 A1* 10/2019 Yamada ................... H02K 1/20
2023/0291271 A1* 9/2023 Araki ....................... H02K 9/19

FOREIGN PATENT DOCUMENTS

CN 107925306 B 3/2020
JP H09308183 A * 11/1997
(Continued)

OTHER PUBLICATIONS

JP-H09308183—A Machine Translation (Year: 1997).*
(Continued)

*Primary Examiner* — Oluseye Iwarere
*Assistant Examiner* — Masoud Vaziri
(74) *Attorney, Agent, or Firm* — KARCESKI IP LAW, PLLC

(57) ABSTRACT

A rotating electric machine case includes: a body in a hollow shape; and a flow path, provided between an inner circumferential portion and an outer circumferential portion of the body, configured to allow a refrigerant to pass from one end portion toward the other end portion in an axial direction of the body. In addition, an inner diameter of the body is constant in the axial direction of the body, and a dimension from the inner circumferential portion of the body to the outer circumferential portion of the body is larger on a downstream side of the flow path than on an upstream side of the flow path.

5 Claims, 8 Drawing Sheets

(56) References Cited

FOREIGN PATENT DOCUMENTS

| | | | |
|----|--------------|-----|---------|
| JP | 2008253024 A | | 10/2008 |
| JP | 2012065394 A | | 3/2012 |
| JP | 2015019494 A | | 1/2015 |
| JP | 2019004658 A | * | 1/2019 |
| JP | 2019161798 A | | 9/2019 |
| WO | 2012156104 A1 | | 11/2012 |

OTHER PUBLICATIONS

JP-2019004658—A Machine Translation (Year: 2019).*
Japanese Office Action dated Dec. 10, 2024, for Japanese Patent Application No. 2021-101705.
International Search Report dated Aug. 30, 2022, for International Patent Application No. PCT/JP2022/023791.
Extended European Search Report dated Apr. 7, 2025, for European Patent Application No. 22824997.5.

* cited by examiner

UPSTREAM SIDE           DOWNSTREAM SIDE

UPSTREAM        DOWNSTREAM
SIDE                SIDE

UPSTREAM
SIDE      DOWNSTREAM
SIDE

UPSTREAM
SIDE ←——→ DOWNSTREAM
SIDE

UPSTREAM
SIDE ←——→ DOWNSTREAM
SIDE

ROTATING ELECTRIC MACHINE CASE AND ROTATING ELECTRIC MACHINE

CROSS-REFERENCE TO RELATED APPLICATION(S)

This is a National Stage Entry into the United States Patent and Trademark Office from International Patent Application No. PCT/JP2022/023791, filed on Jun. 14, 2022, which relies on and claims priority to Japanese Patent Application No. 2021-101705, filed on Jun. 18, 2021, the entire contents of both of which are incorporated herein by reference.

FIELD OF THE INVENTION

Embodiments of the present invention relate to a rotating electric machine case and a rotating electric machine.

BACKGROUND OF THE INVENTION

Conventionally, in rotating electric machines such as electric motors and generators, a structure has been known that allows a refrigerant such as water to pass through a flow path provided inside the case outside the stator in order to prevent excessive heat generation due to drive of the rotating electric machine. Cooling the stator from the outside by cooling the case with the refrigerant prevents overheating of the rotating electric machine.

In such a water cooling configuration of a rotating electric machine, the temperature of the refrigerant flowing through the flow path may rise as progress from the inflow side toward the outflow side of the flow path, resulting in uneven cooling effect. In this case, the temperature of the stator may become uneven.

SUMMARY OF THE INVENTION

Embodiments of the present invention each provide a rotating electric machine case and a rotating electric machine that can prevent uneven cooling effect.

A rotating electric machine case of an embodiment includes: a body in a hollow shape; and a flow path, provided between an inner circumferential portion and an outer circumferential portion of the body, configured to allow a refrigerant to pass from one end portion toward the other end portion in an axial direction of the body, in which an inner diameter of the body is constant in the axial direction of the body, and a dimension from the inner circumferential portion of the body to the outer circumferential portion of the body is larger on a downstream side of the flow path than on an upstream side of the flow path.

A rotating electric machine of an embodiment includes: a rotating electric machine case described above; a stator fixed to an inside of the rotating electric machine case; and a rotor provided in a rotatable manner with respect to the stator via a gap between the rotor and the stator.

DESCRIPTION OF EMBODIMENT(S) OF THE INVENTION

Figure 1:
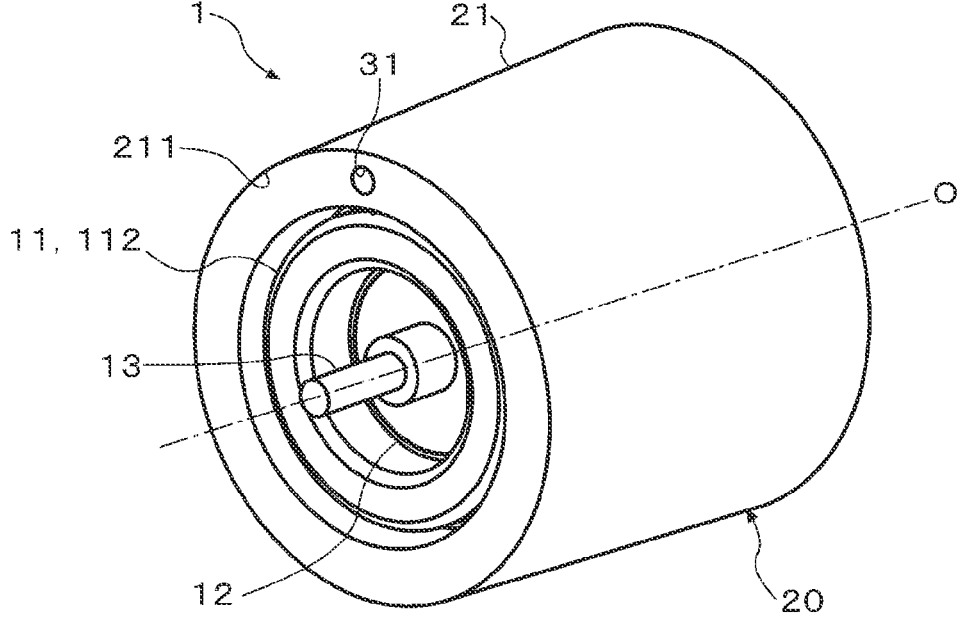
FIG. 1 is a perspective view showing an appearance in an example of a rotating electric machine according to a first embodiment.

Hereinafter, a plurality of embodiments will be described with reference to the drawings. In addition, in a plurality of embodiments, substantially the same elements are given the same reference numerals, and description thereof will be omitted.

First Embodiment

Figure 2:
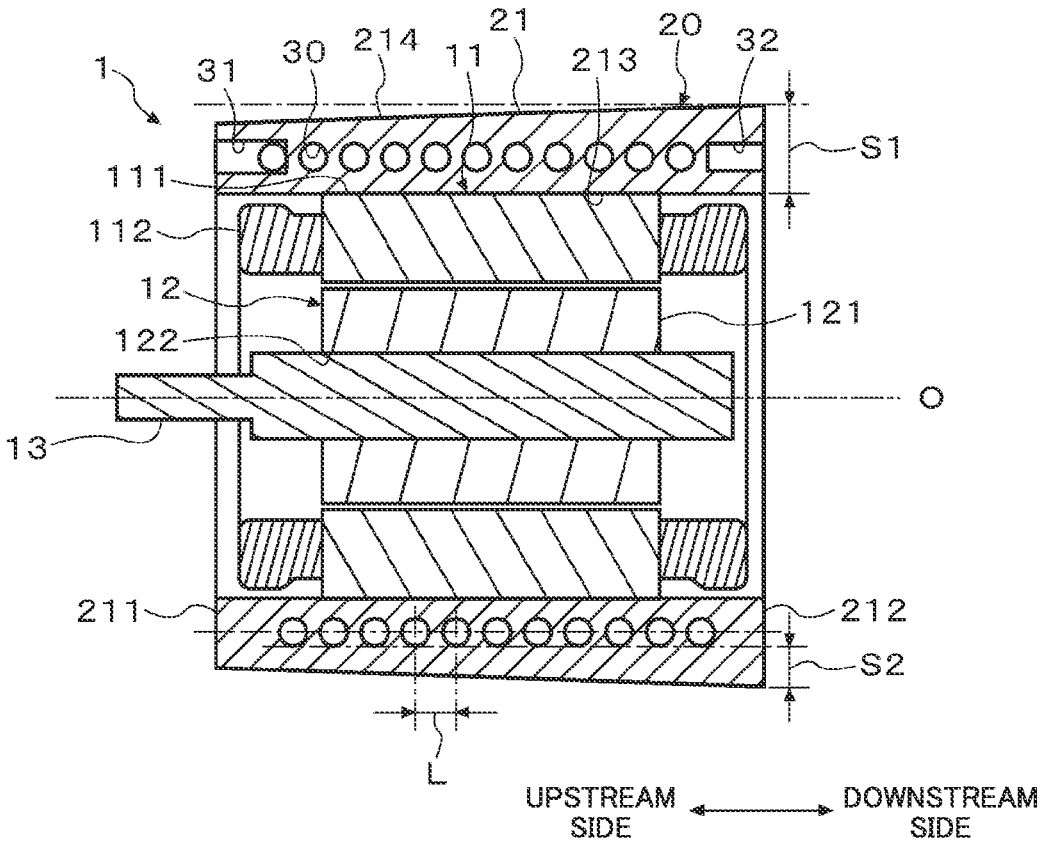
FIG. 2 is a cross-sectional view showing an internal configuration in the example of the rotating electric machine according to the first embodiment

A rotating electric machine 1 of the embodiment shown in FIGS. 1 and 2 includes a stator 11, a rotor 12, a shaft 13, and a case 20. Note that in the following description, a direction parallel to the central axis O of the rotating electric machine will be referred to as an axial direction. When the rotor 12 is rotated about the central axis O, a direction in which the outer circumferential surface of the rotor 12 moves is referred to as a circumferential direction. A direction orthogonal to the central axis O is referred to as a radial direction.

The stator 11 is fixed inside the case 20. The stator 11 includes a stator core 111 and a stator winding 112. The stator core 111 has a cylindrical shape, for example, and is formed by laminating a plurality of disc-shaped electromagnetic steel plates. The stator winding 112 is wound around stator core 111. The stator winding 112 is electrically connected to a power supply unit (not shown), and a drive current is supplied from the power supply unit.

The rotor 12 is provided inside the stator 11 and is rotatably provided with respect to the stator 11 via a gap therebetween. In other words, in the present embodiment, the rotating electric machine 1 is configured as, for example, an inner rotor type rotating electric machine. The rotor 12 has a rotor core 121 and a through hole 122. The rotor core 121 is formed by laminating, for example, a plurality of disc-shaped electromagnetic steel plates. Furthermore, permanent magnets (not shown) are embedded in the rotor core 121. The through hole 122 is provided in the central portion of the rotor 12, and has the shaft 13 inserted therethrough.

The shaft 13 has a cylindrical shape, for example, and passes through the through hole 122. The shaft 13 is fixed to the rotor core 121 by being fitted into the rotor core 121 by shrink fitting, press fitting, or the like. The shaft 13 rotates integrally with the rotor 12 as the rotor 12 rotates.

For example, one end portion of the shaft 13 protrudes outward from the case 20, in this case, to the left side of the paper in FIG. 2. A load is connected to a portion of the shaft 13 that protrudes outward from the case 20. In the present embodiment, of both end portions of the shaft 13, the end portion to which a load is connected may be referred to as the load side, and the end portion to which the load is not connected may be referred to as the anti-load side. In the example of FIG. 2, the left side of the paper in the shaft 13 is the load side, and the right side of the paper therein is the anti-load side.

The case 20 has a body 21 and a flow path 30. The body 21 is made of, for example, an aluminum alloy, and has a hollow shape with both end portions 211 and 212 in the axial direction being open. The body 21 is set to a size that can accommodate the stator 11 and the rotor 12 therein. In this case, the stator 11 is fixed to the inner circumferential portion 213 of the body 21 by shrink fitting, press fitting, or the like. Further, the center in the axial direction of the body 21 coincides with the central axis O of the rotor 12.

As shown in FIG. 2, the inner diameter of the body 21 is set constant in the axial direction of the body 21. In other words, the inner diameter of the body 21 does not change from one end portion 211 to the other end portion 212 in the axial direction of the body 21. Contrarily, the outer diameter of the body 21 differs in the axial direction of the body 21. In other words, the outer diameter of the body 21 changes from one end portion 211 to the other end portion 212 in the axial direction of the body 21.

Specifically, the outer circumferential portion 214 of the body 21 is formed to be farther from the central axis O in the axial direction of the body 21 as progress from one end portion 211 toward the other end portion 212 in the axial direction of the body 21. In other words, the body 21 is formed into a so-called conical cylinder shape that has a cylindrical shape having a constant inner diameter, the cylindrical shape penetrating the center of a truncated cone that expands from a side of one end portion toward a side of the other end portion in the axial direction of the shaft 13. That is, in the case of the present embodiment, the body 21 is formed, for example, in the conical cylinder shape that expands from the load side toward the anti-load side.

As a result, the outer circumferential portion 214 of the body 21 is formed to incline outward in the radial direction of the body 21 from one end portion 211 toward the other end portion 212 in the axial direction of the body 21. Therefore, as shown in FIG. 2, the dimension S1 from the inner circumferential portion 213 to the outer circumferential portion 214 of the body 21 gradually increases from one end portion 211 toward the other end portion 212 in the axial direction of the body 21. The dimension S1 means a variable indicating the thickness dimension of the body 21 at a point in the axial direction of the body 21.

The flow path 30 is formed between the inner circumferential portion 213 and the outer circumferential portion 214 of the body 21, as shown in FIG. 2. The flow path 30 is for allowing a refrigerant such as water or oil to pass. The flow path 30 extends from one end portion 211 toward the other end portion 212 in the axial direction of the body 21, and is configured as a single flow path that does not branch in the middle. In other words, one end portion 211 in the axial direction of the body 21 is on the upstream side of the flow path 30, and the other end portion 212 therein is on the downstream side of the flow path 30 thereof.

Figure 3:
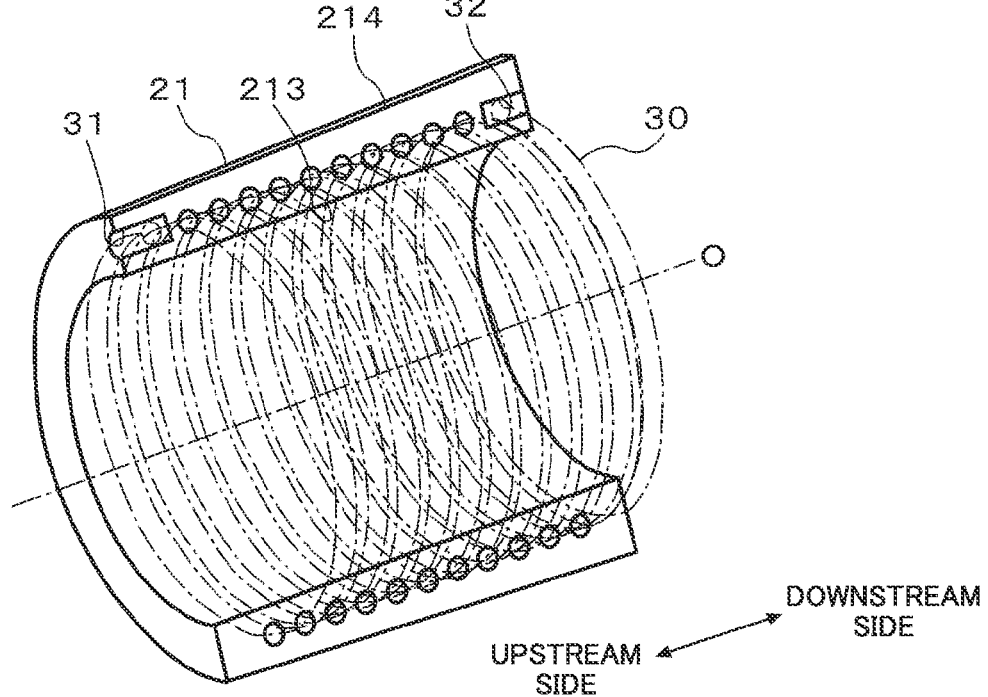
FIG. 3 is a diagram showing a positional relationship between a body and a flow path inside a case in the example of the rotating electric machine according to the first embodiment.
Figure 4:
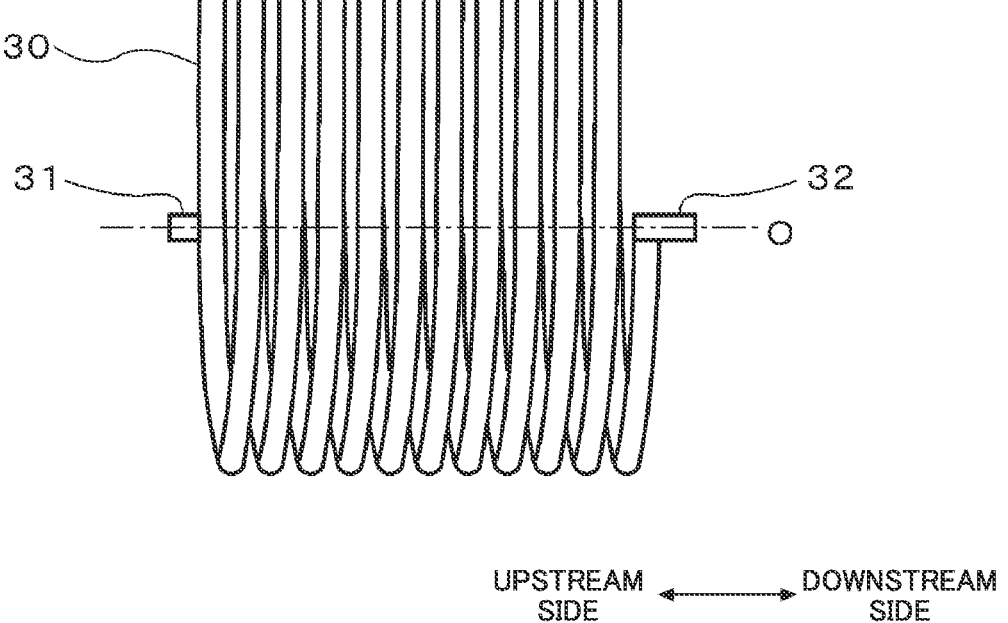
FIG. 4 is a plan view showing an example of a flow path in the example of the rotating electric machine according to the first embodiment.

As shown in FIGS. 3 and 4, the flow path 30 is formed, for example, in a spiral shape centered on the central axis O. In this case, as shown in FIG. 2, when a cross-section is seen that is taken along a plane along the central axis O of the body 21, adjacent portions of the flow path 30 are disposed so that a center-to-center distance L between the adjacent portions is constant in the axial direction of the body 21. In other words, the center-to-center distance L between the adjacent portions of flow path 30 is constant on the upstream and downstream sides of the flow path 30.

Further, as described above, the outer circumferential portion 214 of the body 21 inclines outward in the radial direction of the body 21 with respect to the central axis O from one end portion 211 toward the other end portion 212 in the axial direction of the body 21. Therefore, the dimension S1 from the inner circumferential portion 213 to the outer circumferential portion 214 of the body 21 is set larger on the downstream side of the flow path 30 than on the upstream side thereof. As shown in FIG. 2, when a cross-section is seen that is taken along a plane passing through the central axis O of the body 21, the dimension S2 from the part of flow path 30 facing the outer circumferential portion 214 of the body 21 to the outer circumferential portion 214 of the body 21 is set larger on the downstream side of the flow path 30 than on the upstream side thereof.

As shown in FIG. 2, etc., the cross-sectional shape of the flow path 30 can be configured to be circular, but the shape may also be another shape such as a rectangle or a polygon. In addition, although the cross-sectional area of the flow path 30 is constant on the upstream side and the downstream side of the flow path 30, the cross-sectional area on the downstream side may be set smaller than that on the upstream side. Furthermore, the flow path 30 is not limited to a configuration in a spiral shape, and may have a configuration formed in a meandering from one end portion 211 toward the other end portion 212 in the axial direction of the body 21, but is not limited to this as well.

The flow path 30 has an inlet 31 and an outlet 32. The inlet 31 and the outlet 32 communicate the inside and outside of the body 21. The inlet 31 and the outlet 32 are formed between the inner circumferential portion 213 and the outer circumferential portion 214 of the body 21 in the axial direction of the body 21, as shown in FIGS. 2 and 3. The inlet 31 is formed on the side of one end portion 211 of the body 21, and the outlet 32 is formed on the side of the other end portion 212 of the body 21. In other words, the inlet 31 is formed upstream of the flow path 30, and the outlet 32 is formed downstream of the flow path 30. The inlet 31 and the outlet 32 face in opposite directions in the axial direction of the body 21.

Further, as shown in FIG. 2, when a cross-section is seen that is taken along a plane passing through the central axis O of the body 21, the inlet 31 and the outlet 32 are disposed on the same axis parallel to the central axis O of the body 21. Note that the inlet 31 and the outlet 32 may be provided in the outer circumferential portion 214 of the body 21 toward the outside in the radial direction of the body 21.

The inlet 31 is a portion where the refrigerant flows into the flow path 30. On the other hand, the outlet 32 is a portion where the refrigerant flows out of the flow path 30. In this case, the inlet 31 and the outlet 32 are connected to pipes, hoses, or the like that are not shown. Refrigerant is supplied to the inlet 31 from the pipes, hoses, or the like, and the refrigerant flows into the flow path 30 from the inlet 31. The refrigerant that has flowed into the flow path 30 passes through the flow path 30 while removing the heat transferred from the stator 11, in which heat is generated by the drive of the rotating electric machine 10, to the body 21, and is then discharged to the outside of the body 21 from the outlet 32.

Here, the body 21 is manufactured, for example, by casting. In this case, for example, a pipe-shaped piece, made of steel such as stainless steel and manufactured in the same shape as the flow path 30, is cast into the pre-manufactured body 21 and integrated with the body 21, thereby enabling the flow path 30 to be formed inside the body 21. Further, the flow path 30 may be formed inside the body 21 using a core or the like (not shown) that is previously manufactured in the same shape as the flow path 30, but is not limited thereto.

According to the embodiment described above, a rotating electric machine case 20 includes the body 21 in a hollow shape and the flow path 30. The flow path 30 is provided between the inner circumferential portion 213 and the outer circumferential portion 214 of the body 21 and allows the refrigerant to flow from one end portion 211 toward the other end portion 212 in the axial direction of the body 21. The inner diameter of the body 21 is constant in the axial direction of the body 21.

Figure 5:
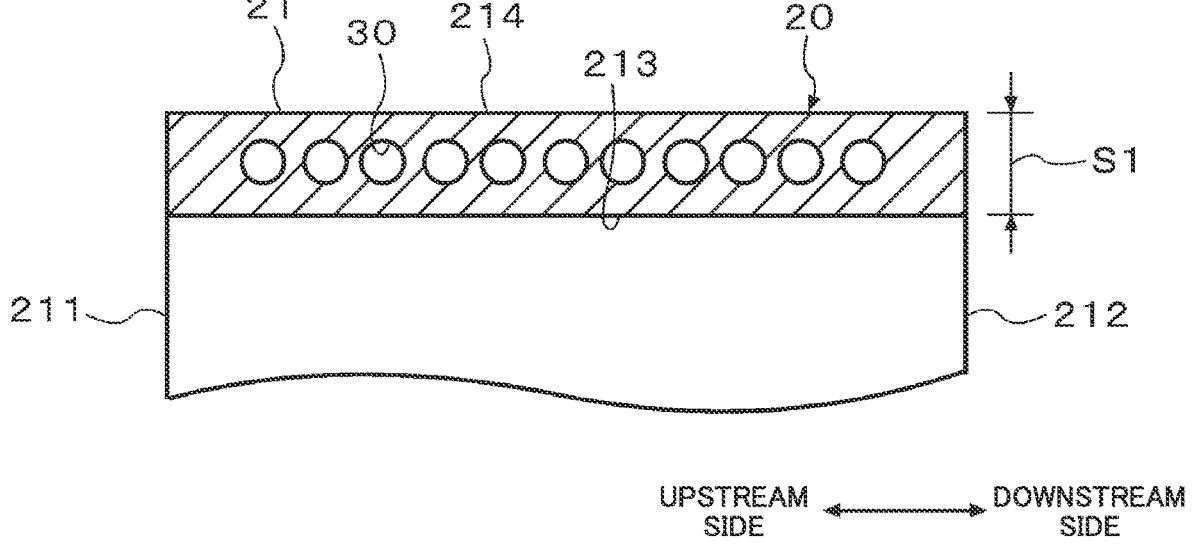
FIG. 5 is a cross-sectional view showing an enlarged view of an example of a positional relationship of a flow path inside a case in a conventional configuration.

Here, as shown in FIG. 5, for example, when the dimension S1 from the inner circumferential portion 213 to the outer circumferential portion 214 of the body 21, that is, the wall thickness of the body 21 is constant on the upstream side and the downstream side of the flow path 30, the temperature of the refrigerant flowing through the flow path 30 gradually rises as progress from the upstream side toward the downstream side of the flow path 30. This may cause the cooling efficiency to be lower on the downstream side of the flow path 30 than on the upstream side thereof, resulting in uneven cooling effect between the upstream side and the downstream side of the flow path 30.

Therefore, in the present embodiment, the dimension S1 from the inner circumferential portion 213 to the outer circumferential portion 214 of the body 21 is larger on the downstream side of the flow path 30 than on the upstream side thereof. Further, there are no cavities other than the flow path 30 inside the body 21. Therefore, the heat capacity of the body 21 can increase in proportion to the dimension S1. According to this, the dimension S1 from the inner circumferential portion 213 to the outer circumferential portion 214 of the body 21, that is, the wall thickness of the body 21 is made larger on the downstream side of the flow path 30 than on the upstream side thereof. This allows the heat capacity of the body 21 to be larger on the refrigerant outflow side than that on the refrigerant inflow side.

Thereby, heat can be easily transferred from the refrigerant to the body 21 on the refrigerant outflow side. This can prevent the refrigerant from temperature rise as progress from the inflow side toward the outflow side. This then can prevent the refrigerant from decrease in the cooling efficiency on the outflow side, resulting in prevention of uneven cooling effect.

Further, the dimension S1 from the inner circumferential portion 213 to the outer circumferential portion 214 of the body 21 gradually increases from one end portion 211 toward the other end portion 212 in the axial direction of the body 21. According to this, the temperature gradient of the refrigerant from one end portion 211 to the other end portion 212 in the axial direction of the body 21 is made gentler, thereby making it possible to more accurately eliminate unevenness in the cooling effect.

Further, the rotating electric machine case 20 further includes the inlet 31 and the outlet 32. The inlet 31 is provided on the side of one end portion 211 in the axial direction of the body 21, and is a portion where the refrigerant flows into the flow path 30. The outlet 32 is provided on the side of the other end portion 212 in the axial direction of the body 21, and is a portion where the refrigerant flows out of the flow path 30. The inlet 31 and the outlet 32 are disposed on the same axis parallel to the central axis O of the body 21.

According to this, the inlet 31 and the outlet 32 are thus disposed on the same axis parallel to the central axis O of the body 21. This makes it possible to: simplify the routing of piping, etc. connected to the inlet 31 and the outlet 32; and improve the ease of assembly of the case 20.

Figure 6:
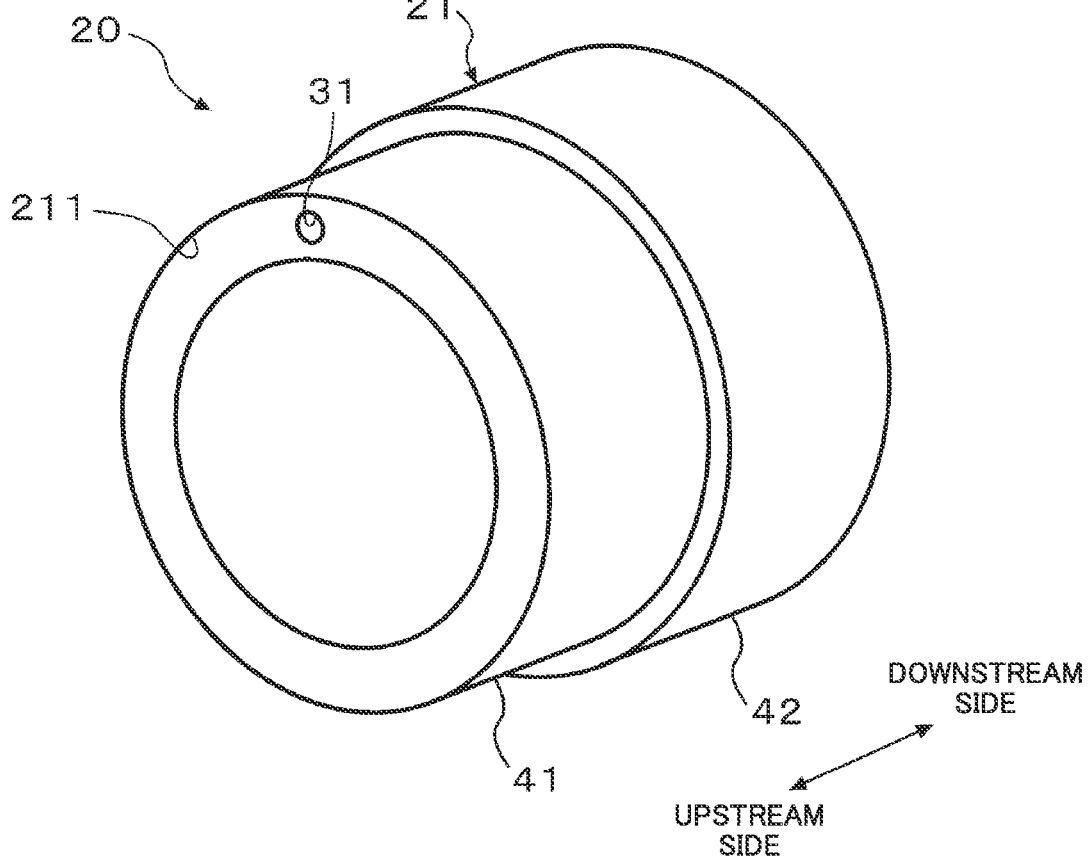
FIG. 6 is a perspective view showing another example of a configuration of a case in the example of the rotating electric machine according to the first embodiment.
Figure 7:
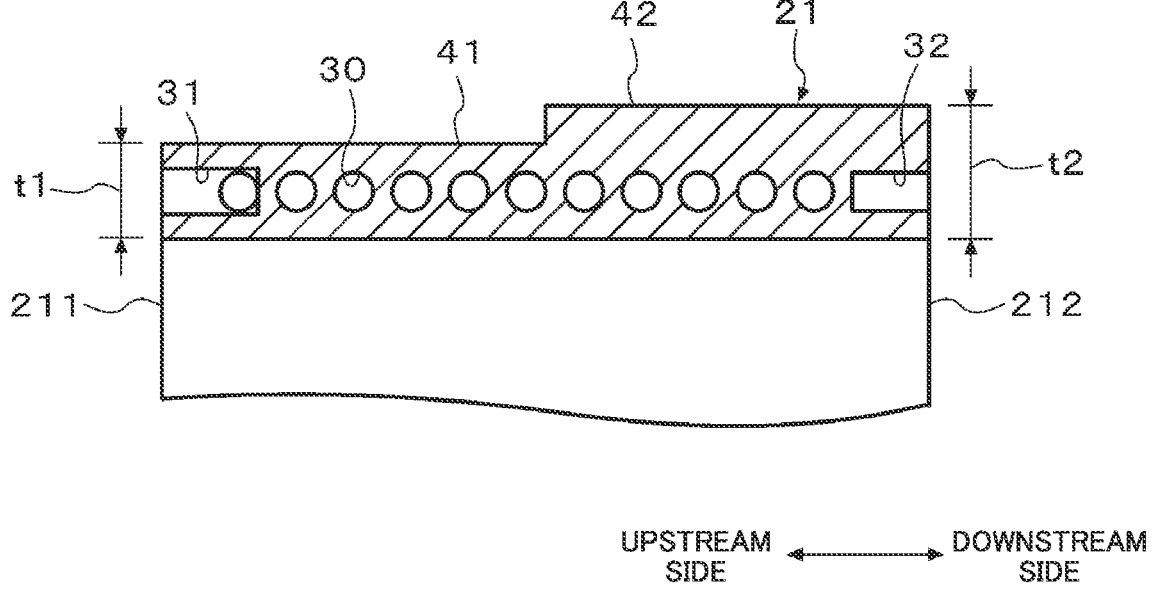
FIG. 7 is a cross-sectional view showing an enlarged view of another example of a positional relationship between the body and the flow path inside the case in the example of the rotating electric machine according to the first embodiment.

As shown in FIGS. 6 and 7, the case 20 can be configured such that part of the outer circumferential portion 214 of the body 21 protrudes in a step-like manner in the axial direction of the body 21. In this case, in the examples shown in FIGS. 6 and 7, the body 21 has a thin wall portion 41 and a thick wall portion 42. The thin wall portion 41 is disposed on the side of one end portion 211 in the axial direction of the body 21. As shown in FIG. 7, the wall thickness t1 of the thin wall portion 41 is set to approximately twice the dimension of the flow path 30.

The thick wall portion 42 is disposed on the side of the other end portion 212 in the axial direction of the body 21. In other words, the thick wall portion 42 is disposed on the downstream side of the flow path 30 than the thin wall portion 41. As shown in FIG. 7, the thick wall portion 42 has the same inner diameter as the thin wall portion 41, and is formed so as to extend outward in the radial direction at a substantially right angle to the axial direction of the body 21. The wall thickness t2 of the thick wall portion 42 is set to different dimension from the wall thickness t1 of the thin wall portion 41. In this case, the wall thickness t2 of the thick wall portion 42 is set to larger dimension than the wall thickness t1 of the thin wall portion 41. Further, the length of the thick wall portion 42 in the axial direction may be the same as or different from the length of the thin wall portion 41 in the axial direction, and can be set in any way according to the cooling performance required of the case 20.

This also allows the wall thickness of the body 21 to be larger on the downstream side of the flow path 30 than on the upstream side thereof, so that the heat capacity of the body 21 on the refrigerant outflow side can be made larger than that on the refrigerant inflow side. This makes it possible to prevent the refrigerant from temperature rise as the refrigerant moves from the inflow side to the outflow side. This can prevent the cooling effect from being uneven.

Second Embodiment

Next, a second embodiment will be described with reference to FIG. 8. when a cross-section is seen that is taken along a plane passing through the central axis O of the body 21, the configuration of the second embodiment is different from the above first embodiment in the center-to-center distance between adjacent portions of the flow path 30. Specifically, in the above first embodiment, when a cross-section is seen that is taken along a plane passing through the central axis O of the body 21, the center-to-center distance L between adjacent portions of the flow path 30 can be set constant on the upstream side and the downstream side.

Contrarily, in the present embodiment, when a cross-section is seen that is taken along a plane passing through the central axis O of the body 21, the center-to-center distance between adjacent portions of flow path 30 decreases as progress toward the downstream side. In other words, as shown in FIG. 8, the center-to-center distance L1 between adjacent portions of flow path 30 on the upstream side is larger than the center-to-center distance L2 on the downstream side. Therefore, the cross-sectional area of the flow path 30 with respect to the cross-sectional area of the body 21 occupies a larger proportion on the side of the other end portion 212 in the axial direction of the body 21 than on the side of the one end portion 211 therein.

According to this, the area in which the refrigerant contacts the heat transferred from the stator 11, etc. on the side of the inner circumferential portion 213 of the body 21 can be made larger on the downstream side than on the upstream side. This makes it possible to increase the area in which heat exchange takes place on the downstream side where the temperature of the refrigerant tends to rise compared to the upstream side, resulting in further prevention of the cooling effect from being uneven.

Figure 8:
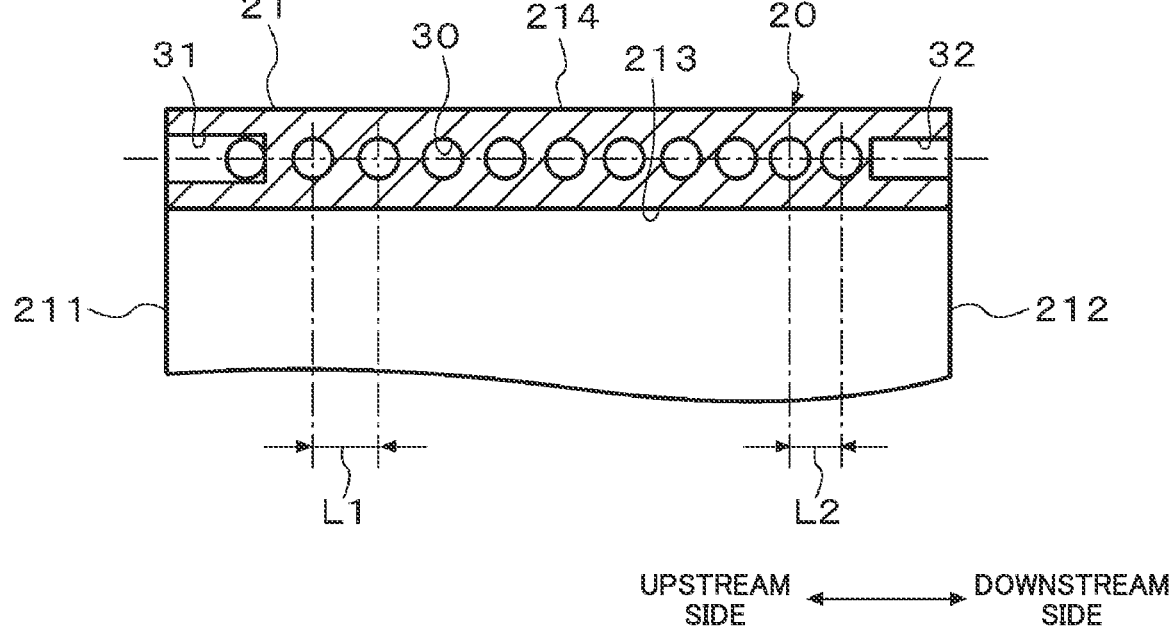
FIG. 8 is a cross-sectional view showing an enlarged view of a relationship created by center-to-center distances between adjacent portions of a flow path in an example of a rotating electric machine according to a second embodiment.

In the present embodiment, a configuration has been disclosed in which the wall thickness of the body 21 is constant on the upstream side and the downstream side, that is, the thickness does not change, as shown in FIG. 8. However, the present invention is not limited to this, and similarly to the above first embodiment, there may a configuration in which the body 21 has a larger wall thickness on the downstream side than on the upstream side. This makes it possible to more effectively prevent the cooling effect from being uneven.

Although a plurality of embodiments of the present invention have been described above, these embodiments are presented as examples and are not intended to limit the scope of the invention. These novel embodiments can be implemented in various other forms, and various omissions, substitutions, and changes can be made without departing from the gist of the invention. These embodiments and their modifications are included within the scope and gist of the invention, as well as within the scope of the invention described in the claims and their equivalents.

The invention claimed is:

1. A rotating electric machine case, comprising:
a body in a hollow shape; and
a flow path, provided between an inner circumferential portion and an outer circumferential portion of the body, configured to allow a refrigerant to pass from one end portion toward the other end portion in an axial direction of the body, wherein an inner diameter of the body is constant in the axial direction of the body, and a dimension from the inner circumferential portion of the body to the outer circumferential portion of the body is larger on a downstream side of the flow path than on an upstream side of the flow path, and
wherein a dimension from a part of the flow path facing the outer circumferential portion of the body to the outer circumferential portion of the body is larger on the downstream side of the flow path than on the upstream side of the flow path.

2. The rotating electric machine case according to claim 1, wherein:
the flow path is formed in a spiral shape between an inner circumferential portion and an outer circumferential portion of the body,
wherein, when a cross-section is taken along a plane passing through a central axis of the body, a center-to-center distance between adjacent portions of the flow path decreases in a direction toward a downstream of the flow path.

3. The rotating electric machine case according to claim 1, wherein a dimension from the inner circumferential portion to the outer circumferential portion of the body gradually increases as progress from the one end portion toward the other end portion in the axial direction of the body.

4. The rotating electric machine case according to claim 1, further comprising:
an inlet, provided on a side of the one end portion in the axial direction of the body, configured to allow a refrigerant to flow into the flow path; and
an outlet, provided on a side of the other end portion in the axial direction of the body, configured to allow a refrigerant to flow out of the flow path,
wherein the inlet and the outlet are disposed on an identical axis parallel to a central axis of the body.

5. A rotating electric machine, comprising:
a rotating electric machine case according to claim 1;
a stator fixed to an inside of the rotating electric machine case; and
a rotor provided in a rotatable manner with respect to the stator via a gap between the rotor and the stator.

* * * * *